(12) United States Patent
Hernandez Olvera

(10) Patent No.: US 9,707,505 B2
(45) Date of Patent: Jul. 18, 2017

(54) SYSTEM FOR TRAPPING POLLUTING EMISSIONS

(71) Applicant: Ciro Alfredo Hernandez Olvera, Baja California (MX)

(72) Inventor: Ciro Alfredo Hernandez Olvera, Baja California (MX)

(73) Assignee: Ciro A. Hernández Olvera, Heber, CA (US)

( * ) Notice: Subject to any disclaimer, the term of this patent is extended or adjusted under 35 U.S.C. 154(b) by 32 days.

(21) Appl. No.: 14/350,293

(22) PCT Filed: Oct. 2, 2012

(86) PCT No.: PCT/MX2012/000096
§ 371 (c)(1),
(2) Date: Apr. 7, 2014

(87) PCT Pub. No.: WO2013/051922
PCT Pub. Date: Apr. 11, 2013

(65) Prior Publication Data
US 2014/0245892 A1    Sep. 4, 2014

(30) Foreign Application Priority Data

Oct. 5, 2011   (MX) ............... MX/u/2011/000438 U

(51) Int. Cl.
*B01D 47/02*    (2006.01)
*B01D 53/38*    (2006.01)
(Continued)

(52) U.S. Cl.
CPC .......... *B01D 47/02* (2013.01); *B01D 47/021* (2013.01); *B01D 47/18* (2013.01); *B01D 53/38* (2013.01);
(Continued)

(58) Field of Classification Search
CPC ........ B01D 2252/204; B01D 2257/304; B01D 2257/504; B01D 3/08; B01D 53/1425;
(Continued)

(56) References Cited

FOREIGN PATENT DOCUMENTS

KR    CA 2811194 A1 *  3/2012   ............. B01D 46/10

* cited by examiner

*Primary Examiner* — Christopher P Jones
*Assistant Examiner* — Cabrena Holecek

(57) ABSTRACT

The invention relates to a system for trapping atmospheric emissions, made up of a liquefaction tank which contains a liquid that traps the dust, smokes or gas, which are injected into the same through a main duct, to which the source of the emission to be trapped is connected, said duct including a first fan which operates by absorbing and propelling the dust, smoke and gas, guiding same into the liquefaction tank, said duct being sealed at the end of thereof, the side walls of the duct comprising at least ten outlet openings, the invention also comprising a system with at least two walls with the same effect and perforations, this causing the liquefaction of the trapped material, likewise, the invention comprises a cooling system, which guides the liquid from the tank into a serpent coil and from there to a pump which generates the recirculation of the liquid; at the top of the tank, the invention comprises an outlet duct via which the gases produced by liquefaction are guided into a compressor, which has the function of compressing the gases and injecting same into a first gas-storage tank.

2 Claims, 2 Drawing Sheets

(51) Int. Cl.
*B01D 53/79* (2006.01)
*B01D 47/18* (2006.01)
*B01D 53/00* (2006.01)

(52) U.S. Cl.
CPC ............ *B01D 53/79* (2013.01); *B01D 53/002* (2013.01); *B01D 2247/04* (2013.01); *B01D 2247/12* (2013.01); *B01D 2258/06* (2013.01)

(58) Field of Classification Search
CPC   B01D 53/1456; B01D 53/1475; B01D 53/18; C10L 3/102
See application file for complete search history.

SYSTEM FOR TRAPPING POLLUTING EMISSIONS

TECHNICAL FIELD

The invention refers to a mechanical type model that for use in capturing polluting emissions such as dust, gases, vapors or smoke obviously, to prevent atmospheric pollution produced by said industrial wastes, contributing in that the population avoids the respiratory diseases that this entails, and in turn allows obtaining byproducts of the separated materials for use in various products and processes.

BACKGROUND

Currently we find means which are used in different industrial technologies for preventing pollution by dust, gases, smoke, etc. In the state of the art an application in the name of the inventor under the record number MX/a/2007/009871 can be found and which relates to a system that comprises a furnace for incinerating waste material, such as tires, which generates smoke from the incinerated material itself and which is treated in the system to eliminate the contaminants contains in the smoke. The smoke is driven by fans and conveyed along a duct until it reaches a cooling medium; as the smoke is conveyed along the duct, oxygen is provided from an air purifier so that when it contacts the smoke, a process of solidification initiates. There are gates along the duct, which allow the conveyed material to be diverted so that it will adhere to the walls of the duct, as from where the smoke begins the conveyance process, on the upper housing of the duct there is a pipe which by means of a number of perforations provides water from a feed reservoir, said water falls on the duct that conveys the smoke; inside the duct, the smoke reaches and passes through a cutting disc where a fan drives it further, towards a tank filled with liquid, said tank comprises a number of compartments with surface under vacuum and the bottom of said tank comprises a grid structured conically to extract the product by decantation means. The same comprises a series of helixes to facilitate the conveyance and liquefaction of the smoke; the top part of the tank comprises a duct which conveys the gas which results from the process said gas is extracted and driven by a fan, the duct has a supply of oxygen provided by an air purifier; the duct forms a U turn and reaches a chamber which comprises duly installed walls for the impact of the gas, comprising at the top part a valve to release pressure and at the bottom a structure for the release of the product as a solid, in the top part the duct continues in a return direction towards the incinerating oven, in said patent application said system operates as a closed circuit as it recirculates the gas, releasing it at a certain pressure in the release tank; the innovation proposed by the inventor does not release any dust, gas or steam into the atmosphere, but captures said dust, gas or steam within the system at a certain stage of its operation.

ADVANTAGES

1. The invention offers a new alternative for treating and capturing emissions into the atmosphere in an ecological manner.
2. This system is simple to operate.
3. The invention comprises a reduced number of stages.
4. The system can be adapted to be carried out in a modular manner, as sections of the process can be repeated.
5. The system can be adapted to work by means of sensors and flow and volume meters which shorten operating times.

DESCRIPTION

The characteristic details of this novel system for capturing polluting emissions are clearly shown in the following description and the accompanying drawings, as well as an illustration of same and following the same reference numerals to indicate the parts and the figures shown.

Figure 1:
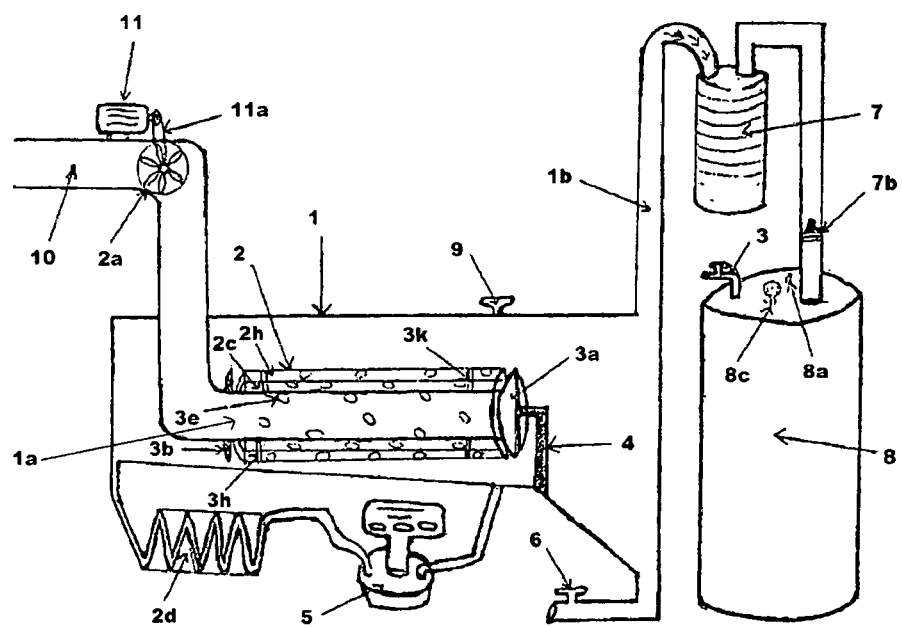
FIG. 1 is a side plan view of the system for capturing polluting emissions
Figure 2:
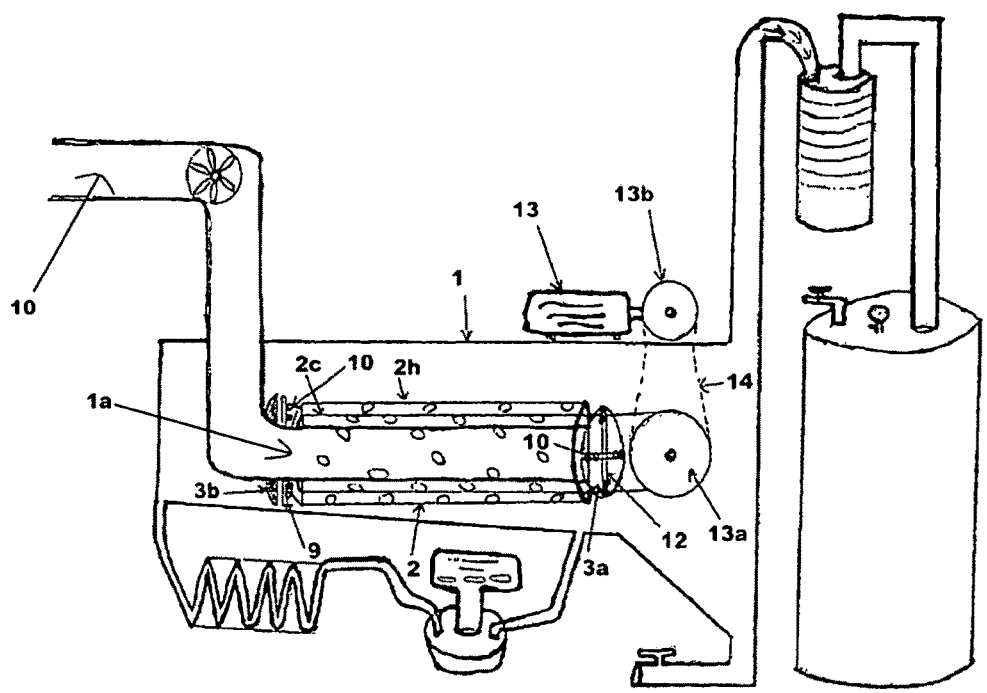
FIG. 2 is a side plan view of a variation of the system for capturing polluting emissions Referring to said illustration the system for capturing polluting emissions comprises.

A main duct 10, is connected to the output of the particle emitter of those particles which require capturing (such emitter is conventional, such as exhaust, incinerator, chimney, etc. just to mention a few). Said particles are then absorbed and driven by a fan 2a which is rotated by means of a band 11a connected between the pulleys of the fan 2a and a conventional electrical motor 11 installed on the outer surface of the duct 10 the wind flow conveys the particles towards the liquefying mechanism 2—which will be described below—and is located inside the liquefaction tank 1, the same contains liquid such as water mixed with a degreasing liquid, the liquefying mechanism 2 comprises at least three cylindrical and concentric ducts, walls of which comprise at least ten output holes 3e, such that the diameter of the first hole 1a, decreases by 1 cm relative to the diameter of the second hole 2c, and this hole in turn decreases the diameter by one centimeter relative to the third hole 2h and so on with each and every hole; the far end of the duct 1a comprises at least four brackets 3h and at the opposite end comprises also at least four brackets 3k respectively distributed at equal angles relative to the center and which operate as the base and separator relative to the contiguous duct (see FIG. 1), the opening of the duct comprises a cover 3b, which seals the ends of the ducts 2c and 2h, and the opposite side comprises a cover 3a which seals simultaneously the three ducts which comprise the liquefying mechanism; ducts 1a, 2c and 2h which comprise the liquefying mechanism, each comprise at least ten outlet holes 3e, these outlet holes are located on the side walls of these ducts, and wherein the longitudinal sum of the diameter of these holes is directly proportional to the initial diameter of the duct wherein said holes are located, thereby providing the initial pressure loss, thereby causing the liquefaction of the material fed; capturing the particles which enter the liquefying mechanism 2, the difference in weight between the liquid and the particles has the effect of decanting, separating the particulates to the bottom of the tank 1, at the opposite end of where the liquefying mechanism process starts, there is a base 4 which serves as a support between the liquefying mechanism 2 and the liquefaction tank 1, said liquefaction tank 1 comprises a drain valve 6, and a cooling system comprising a coil 2d connected to the liquefaction tank 1 followed by a pump 5 for recirculating liquid, on the upper right side there is an outlet duct 1b, which conveys the resulting gases to a compressor 7 which compresses and conveys the gases to a safety valve 7b, this valve allows the passage of gas to a first storage tank 8, which comprises a pressure meter 8c, a safety valve 8a, a tap 3 for removing the stored products, finally the top of the liquefaction tank 1 comprises a plug 9 through which liquid is fed to the tank 1.

A variation consists in that the duct 2c can be rotatable, thus causing the use of centrifugal force within the liquefying mechanism 2, and which comprises the following: the opening of the duct 1a comprises a cover 3b with at least four brackets 9 in the shape of a cross, in said brackets 9, in each radius and coinciding with the height of the cavity of the second duct 2c there are bolts comprising a pair of bearings 10 thereby enabling the walls of the duct 2c to rotate between the bearings 10, furthermore, this cover 3b supports concentrically the other ducts 2c and 2h; to provide movement to the liquefying mechanism 2, on the opposite end of the opening of the liquefaction system there is a cover 3a with at least four brackets 12; on said brackets, in each radius and coinciding with the height of the cavity of the second duct 2c there are bolts comprising a pair of bearings 10 thereby enabling the walls of the duct 2c to rotate between the bearings 10, furthermore, this cover 3a allows the duct 2c to protrude from the liquefying mechanism 2, the outer end of the duct 2c comprises a first pulley 13a which is rotated by a chain 14 mounted on a second pulley 13b connected to a conventional electric motor 13, installed on top of the liquefaction tank 1.

The invention claimed is:

1. A system for capturing polluting emissions, at an output of a particle emitter, wherein the system comprises:
a duct comprising an outer surface and a fan, wherein the fan comprises rotation means comprising pulleys, a belt attached between the pulleys and an electric motor, the electric motor is mounted on the outer surface of the duct, wherein the fan is configured to drive the polluted emissions output from the particle emitter through the duct and into a liquefying mechanism;
a liquefaction tank and the liquefying mechanism, wherein the liquefying mechanism is located inside of the liquefaction tank, wherein the duct is connected to the liquefying mechanism and conveys the pollutant emissions into the liquefying mechanism, the liquefaction tank contains water mixed with a degreasing liquid, the liquefaction tank further comprises a drain valve, a cooling system comprising a coil connected to the liquefaction tank and connected to a pump configured to recirculate the water mixed with the degreasing liquid, a plug configured to feed the water mixed with the degreasing liquid to the liquefaction tank, and an outlet duct on a top side of the liquefaction tank at an opposite end of the liquefaction tank from an end of the liquefaction tank where the duct enters the liquefaction tank;
the liquefying mechanism comprises at least three cylindrical and concentric ducts, wherein the at least three ducts comprise walls having at least ten output holes, and a first duct of the at least three ducts has a diameter that is 1 cm smaller than a diameter of a second duct of the at least three ducts, and the diameter of the second duct is 1 cm smaller than a diameter of a third duct of the at least three ducts, and so on for each of the diameters of the at least three ducts, wherein each of the at least ten output holes of each of a corresponding duct of the at least three ducts has a diameter wherein a longitudinal sum of the diameters of the at least ten output holes is directly proportional to a respective diameter of the corresponding duct of the at least three ducts;
the duct further comprises a far end and an opposite end, the far end comprises at least four brackets, and the opposite end comprises at least four brackets and a base that serves as a support between the liquefying mechanism and the liquefaction tank, wherein the at least four brackets at the far end and the at least four brackets at the opposite end are respectively distributed at equal angles relative to a center of the duct and are bases and separators for the at least three ducts; the duct further comprises a cover configured to seal a far end of the at least three ducts and a second cover configured to simultaneously seal an opposite end of the at least three ducts, the duct configured to pass the polluting emissions into the liquefying mechanism thereby contacting the water mixed with the degreasing liquid with the polluting emissions and causing a liquefaction of the polluting emissions for capture of particles in the polluting emissions in the liquefying mechanism, the liquefying mechanism configured to decant and separate the particles from the polluting emissions to a bottom of the liquefaction tank and resulting gases to the outlet duct;
the system further comprises:
the outlet duct connected to a compressor;
the compressor, wherein the compressor is configured to compress and convey the resulting gases from the outlet duct to a safety valve;
the safety valve, wherein the safety valve is configured to allow the passage of the resulting gases to the first storage tank;
the first storage tank, wherein the first storage tank comprises a safety valve, a pressure meter, and a tap for removing the resulting gases stored in the storage tank.

2. The system for capturing polluting emissions according to claim 1, further comprising the at least three ducts are configured to rotate;
the cover comprises at least four brackets in the shape of a cross, and the second cover comprises at least four brackets, wherein each of the at least four brackets of the cover and each of the at least four brackets of the second cover contain bolts, wherein each bolt comprises a pair of bearings configured to enable the walls of the at least three ducts to rotate between bearings, wherein the cover is configured to support the at least three ducts;
the second cover is configured to allow the duct to protrude from the liquefying mechanism;
the opposite end of the duct further comprises a first pulley and a second pulley, wherein the first pulley is configured to be rotated by a chain mounted on the second pulley and connected to an electric motor;
the electric motor, wherein the electric motor is installed on top of the liquefaction tank.

* * * * *